United States Patent [19]

Daughenbaugh et al.

[11] Patent Number: 5,491,214

[45] Date of Patent: Feb. 13, 1996

[54] PROCESS FOR HYDROTREATING RESINS TO LIGHTEN COLOR

[75] Inventors: Norman E. Daughenbaugh, Turtle Creek; Dane G. Goodfellow, Pittsburgh, both of Pa.

[73] Assignee: Hercules Incorporated, Wilmington, Del.

[21] Appl. No.: 437,101

[22] Filed: May 5, 1995

Related U.S. Application Data

[63] Continuation of Ser. No. 37,805, Mar. 26, 1993, abandoned.

[51] Int. Cl.$^6$ ............................................. C08F 6/24
[52] U.S. Cl. .......................... 528/483; 528/485; 528/487; 528/490
[58] Field of Search .................................. 528/483, 485, 528/487, 490

[56] References Cited

U.S. PATENT DOCUMENTS

| | | | |
|---|---|---|---|
| 2,349,210 | 5/1944 | Traylor | 528/483 |
| 2,793,986 | 5/1957 | Lanning | 196/35 |
| 2,819,289 | 1/1958 | Luben | 260/450 |
| 2,963,467 | 12/1960 | Small | 260/82 |
| 3,029,121 | 4/1962 | Collins | 528/483 |
| 3,100,808 | 8/1963 | Dyer | 525/339 |
| 3,331,824 | 7/1967 | Folzenlogen | 528/483 |
| 3,442,877 | 5/1969 | Moritz et al. | 260/82 |
| 3,484,421 | 12/1969 | Pine et al. | 260/82 |
| 3,882,049 | 5/1975 | Bertolacini et al. | 252/466 |
| 4,206,300 | 6/1980 | Talsma et al. | 528/483 |
| 4,897,175 | 1/1990 | Bricker et al. | 208/12 |
| 4,992,157 | 2/1991 | Bricker et al. | 208/12 |
| 5,077,386 | 12/1991 | Teng et al. | 528/487 |
| 5,171,793 | 12/1992 | Johnson et al. | 525/332.1 |
| 5,292,864 | 3/1994 | Wood et al. | 528/483 |

FOREIGN PATENT DOCUMENTS

| | | |
|---|---|---|
| 046634 | 3/1982 | European Pat. Off. . |
| 378104 | 7/1990 | European Pat. Off. . |
| 499941 | 8/1992 | European Pat. Off. . |
| 1331162 | 5/1963 | France . |
| 4103279 | 8/1992 | Germany . |
| 2251525 | 10/1990 | Japan . |
| 873067 | 7/1961 | United Kingdom . |

OTHER PUBLICATIONS

Chemical Abstracts, vol. 86, No. 4; Apr. 4, 1977; Abstract No. 90940j, "Hydrogenating Hydrocarbon Resins".

*Primary Examiner*—Joseph L. Schofer
*Assistant Examiner*—Tom Weber
*Attorney, Agent, or Firm*—Joanne W. Patterson; Robert P. O'Flynn O'Brien

[57] ABSTRACT

The color of hydrocarbon resins having carbon-carbon double bonds and containing color bodies is lightened by a hydrotreating process comprising contacting a resin having a weight average molecular weight Mw of 250–10,000 with hydrogen in the presence of a catalyst that promotes the hydrogenation of the color bodies without substantially changing the content of carbon-carbon double bonds in the resin. The preferred catalysts are copper chromite and copper/zinc.

69 Claims, No Drawings

PROCESS FOR HYDROTREATING RESINS TO LIGHTEN COLOR

This application is a continuation of application Ser. No. 08/037,805, filed Mar. 26, 1993, now abandoned.

FIELD OF THE INVENTION

This invention relates to a process for lightening the color of resins and resins produced by this process.

BACKGROUND OF THE INVENTION

Methods for hydrogenating hydrocarbon resins to lighten the color are well known and generally produce a product that is "water white" in color. The aliphatic and/or aromatic unsaturation present in the resin is partially or completely eliminated, providing a product with improved oxidative stability, UV resistance and color stability. However, particularly in the case of resins derived from aromatic feedstreams, hydrogenation also alters the physical properties of the resin, which can make it less desirable for use in products such as adhesives, caulks and sealants, plastic and rubber modifiers, and printing inks. It would be advantageous to reduce the color of a resin without changing its other desirable physical characteristics.

Processes for improving the color of "hydrocarbon fractions" and hydrocarbon resins by selective hydrogenation of color bodies and color body precursors have been proposed. For example, U.S. Pat. Nos. 4,897,175 and 4,992,157 disclose a process for improving the color and color stability of "hydrocarbon fractions" such as kerosene, gasoline, straight run naphthas, diesel fuel and lubricating oils. The "hydrocarbon fractions" are contacted with hydrogen in the presence of a selective hydrogenation catalyst such as a Group VIII metal or a sulfided Group VIII metal, which may be on a porous support. Color bodies and color body precursors are hydrogenated.

U.S. Pat. No. 5,171,793 discloses the preparation of heat-stable, light colored resins by hydrogenation of resins produced by thermally polymerizing a feedstock containing a vinyl aromatic component, a cyclodiene component and optionally an acyclic diene component. The resin solution that results from the thermal polymerization is stripped to a softening point of 80°–200° C. before hydrogenation. The hydrogenation is carried out in the presence of (1) a hydrogenation catalyst selected from Group VIII metals, Group VI metals and Group VII metals, which may be activated or carried on a support; (2) a solvent diluent, and (3) an olefinic diluent. Chromophores and double bonds in the resin molecule are hydrogenated. U.S. Pat. No. 2,963,467 discloses a process for making light colored hydrocarbon resins with a softening point above 85° C. by hydrogenating in the presence of a catalyst such as nickel, reduced nickel, nickel sulfide, copper chromite, copper molybdate, and molybdenum disulfide. However, the process also requires initial stripping of the polymerized resin to at least a 100° C. softening point, followed by redissolving the resin in a diluent, and stripping the hydrogenated product at low temperatures and under reduced pressure.

SUMMARY OF THE INVENTION

The process of this invention for lightening the color of noncrystalline hydrocarbon resins having carbon-carbon double bonds and containing color bodies consists essentially of contacting the noncrystalline hydrocarbon resin having a weight average molecular weight Mw of 250–10,000 with hydrogen in the presence of a catalyst that promotes the hydrogenation of the color bodies without substantially changing the softening point or the content of carbon-carbon double bonds in the resin. When the resin is prepared by polymerization of monomers in a solvent, the hydrotreating can take place while the resin is dissolved in the solvent used for the polymerization, and the solvent can be recovered unchanged after the treatment and recycled in the process.

The invention is also directed to resins produced by this process.

The invention provides a method for hydrotreating normally colored resinous materials to lighten the color, preferably to water white (less than Gardner color 1). Normally measured physical properties other than color are unchanged. Fewer processing steps are used than in selective hydrogenation processes known in the art and no additives such as reactive diluents are required. Products containing these lighter colored resins therefore exhibit properties equivalent to those of products that contained untreated resins, while providing a more pleasing visual appearance.

DETAILED DESCRIPTION OF THE INVENTION

The process of this invention for contacting a colored resin with hydrogen in the presence of a catalyst is subsequently referred to as "hydrotreating". The process is a selective hydrogenation process, since the color bodies present in the resin are hydrogenated and the content of carbon-carbon double bonds in the resin remains substantially unchanged. Carbon-carbon double bonds include both ethylenic and aromatic double bonds. In addition, color body precursors are not hydrogenated in this process. In conventional catalytic hydrogenation processes the color bodies, the color body precursors and carbon-carbon double bonds in the resin are hydrogenated.

The process of this invention can be used to lighten the color of a wide variety of hydrocarbon resins such as C-9 resins, C-5 resins, mixed C-9/C-5 resins, vinyl aromatic-modified C-5 resins, dicyclopentadiene resins, aromatic-modified dicyclopentadiene resins, terpene resins and terpene-phenolic resins. The term "resin" as used in this specification indicates a low molecular weight synthetic polymer made by polymerizing unsaturated monomers either thermally or in the presence of an acidic catalyst, e.g., a Friedel-Crafts catalyst. These polymers have a weight average molecular weight ($M_w$) of 250–10,000, preferably 400–6,000, and most preferably 400–2,000. The notations "C-5" and "C-9" indicate that the monomers from which the resins are made are predominantly hydrocarbons having 5 and 9 carbon atoms respectively. All of the resins mentioned above typically have a yellow or amber color before treatment. The softening point of the resin to be treated is not critical, unlike known hydrogenation processes where the resinous starting material is stripped to obtain a resin with a particular softening point before hydrogenating.

Catalysts useful in the process of this invention are hydrogenation catalysts that are selective enough in their action so that only the color bodies are hydrogenated. The carbon-carbon double bonds in the resin are not substantially hydrogenated. Therefore the physical properties of the resin that are commonly measured, e.g., softening point, cloud point, molecular weight, UV absorbance and heat stability, are also unaffected. In addition, color body precursors are not hydrogenated. Color body precursors are defined as colorless materials that become colored after hydrogenation.

Catalysts with the required selectivity can be selected from among various forms of the metals of Groups VIII, VI B, VII B, I B and II B. These metals can be used alone or in combination, either as the free metal, the sulfided metal or as a metal compound. The metals(or metal compounds can be used directly or can be carried on a suitable support such as charcoal or alumina. Copper chromite, copper/zinc, sulfided platinum on charcoal, ruthenium on alumina and palladium on charcoal are preferred. Copper chromite and copper/zinc are most preferred. One copper chromite catalyst typically used is a mixture of copper chromite, copper oxide and manganese oxide. A Cu/Zn catalyst typically used is a mixture of copper, zinc and aluminum oxides. Copper/zinc is particularly useful when the resin is treated while still dissolved in the polymerization solvent. It should be noted that the selectivity of a particular catalyst can be different under different processing conditions.

Additional processing steps such as stripping the resin to a particular softening point before hydrotreating and then redissolving, or stripping the resin after hydrotreating to a particular softening point, may be used. However, one of the advantages of this invention is that they are not needed. Standard procedures such as isolating the hydrotreated resin by stripping and sparging, or neutralizing catalyst residues from the polymerization of the monomers used to make the resins may be included. Quenching agents such as organic phosphites and reactive diluents such as olefinic diluents are not required. A reactive diluent is defined as a diluent that reacts with the hydrogen or the resin. Such diluents are described in U.S. Pat. No. 5,171,793, which is incorporated herein by reference.

The temperature, pressure, reaction time and amount of catalyst used in the process of this invention depend upon various factors such as the type of resin that is being treated, the final color desired and the economics of the process, e.g., some catalysts are very expensive and it would not be commercially feasible to use large amounts. Typically the hydrogen pressure ranges between 50 and 2500 psi, preferably between 100 and 1200 psi and most preferably between 300 and 1200 psi. The temperature ranges between 50° and 300° C., preferably 150°–265° C., and most preferably 200°–250° C. The treatment time typically is between one and four hours. The amount of catalyst used ranges between 0.01 to 20% based on the weight of the resin, preferably between 0.5 to 10%, and most preferably 1 to 2%. In general, higher reaction temperatures or pressures or longer reaction times are required if the weight percent catalyst is low.

When the resins are made by polymerization of monomers in a solvent, the process of this invention can be carried out in the original polymerization solvent after the resins are neutralized and polymerization catalyst residues are removed. The process can also be carried out in a solution of redissolved resin, or the resins can be treated in the molten state (neat). The process can be a batch or continuous process. In batch reactions, the catalyst can be recycled several times.

Using the process of this invention, the color of aliphatic hydrocarbon resins is lightened to less than Gardner 2, preferably less than Gardner 1. The color of aromatic resins is lightened to Gardner 5 or less, preferably Gardner 3 or less, and most preferably less than Gardner 1.

After hydrogenation, an antioxidant is generally added to improve heat stability, e.g., butylated hydroxytoluene or IRGANOX® 1010, a hindered phenol available from Ciba-Geigy, Hawthorne, N.Y. IRGANOX® 1010 is tetrakis[methylene(3,5-di-tert-butyl-4-hydroxyhydrocinnamate)] methane. The antioxidant is generally used in an amount of 0.05 to 1.0% by weight based on the total weight of the resin.

The light colored resins prepared by the process of this invention can be used in adhesives, caulking compounds, sealants, paints, labels, tapes, modifiers, extenders and processing aids for plastics, printing inks, overprint varnishes and other clear coatings, textile dry sizes, ceramic tile grout, varnishes, waterproofing compositions and wax compounds.

In the following examples, OMSCP means odorless mineral spirits cloud point, which is determined by the following procedure. Ten weight percent resin is mixed in a test tube with odorless mineral spirits. The test tube is then heated until a clear solution is formed. The solution is cooled until turbidity is obtained. The onset of initial turbidity is recorded as the initial cloud point. Cooling of the test tube is continued until visibility is totally obstructed. The final cloud point is recorded at the point of no visibility.

MMAP is the mixed methylcyclohexane aniline cloud point, which is determined using a modified ASTM C 611 procedure. Methylcyclohexane is substituted for the heptane used in the standard test procedure. The procedure uses resin/aniline/methylcyclohexane in a ratio of 1/2/1 (5 g/10 ml/5 ml) and the cloud point is determined by cooling a heated, clear blend of the three components until complete turbidity just occurs. Hydrogenation of the unsaturated portion of a resin, particularly aromatic unsaturation, would result in an increase in the MMAP. In the process of this invention, the difference between the MMAP of the resin before hydrotreating and the MMAP after hydrotreating is 5° C. or less, preferably 3° C. or less and most preferably 2° C. or less, indicating that the content of carbon-carbon double bonds in the resin is essentially unchanged.

HMAP is the heptane mixed aniline cloud point, where heptane is used instead of methylcyclohexane in determining the aniline cloud point. The HMAP increases when the unsaturated portion of the resin is hydrogenated.

DACP is the diacetone cloud point and is determined by cooling a heated solution of 5 g resin, 5 g xylene and 5 g diacetone alcohol to the point where the solution becomes cloudy. The DACP increases when the unsaturated portion of the resin is hydrogenated.

R & B softening point is the Ring and Ball softening point, determined according to ASTM E28–67.

To determine Gardner color, 50 weight percent resin is mixed with reagent grade toluene at room temperature until it dissolves. The color of the resin solution is compared to a set of standards on a Gardner Delta Model 212-A Color Comparator, available from BKY Gardner, Inc., Silver Springs, Md. The color values range from 1 to 18, with 18 being the darkest. The notation Gardner 1– (less than Gardner 1) is used to designate a water white solution.

The Yellowness Index (YID) is obtained by direct readout from a Pacific Scientific Spectrogard™ Color System, Model 96, available from BKY Gardner Inc., Silver Springs, Md., using a measurement cell with a path length of 5.0 cm. The Yellowness Index is useful to distinguish colors lighter than Gardner 1. The closer the YID is to 0, the lighter the color. There is no direct correlation between Gardner colors and the YID, but experience has shown that Gardner 1 is approximately equal to a YID of 40 when both are measured as a 50% solution of resin in toluene and the YID is measured with a measurement cell with a path length of 5.0 cm. The resins produced by the process of this invention therefore preferably have a YID of less than forty.

The invention can be further illustrated by the following examples, which are included merely for the purpose of illustration and are not intended to limit the scope of the invention.

In this specification all parts and percentages are by weight unless otherwise noted.

EXAMPLE 1

A solution of 300.0 g PICCOTAC® 95 synthetic resin in 200.0 g aliphatic diluent (recycled mineral spirits) was contacted with hydrogen in the presence of 6.0 g copper chromite (Engelhard 1950P, available from Engelhard Corporation, Chemical Catalyst Group, Iselin, N.J.) in a stirred autoclave for two hours at 200° C. using a hydrogen pressure of 1200 psi. PICCOTAC® 95 synthetic resin, available from Hercules Incorporated, Wilmington, Del., is a C-5 hydrocarbon resin prepared from piperylene concentrate and isobutylene in toluene using an $AlCl_3$ catalyst. The major components of the piperylene concentrate are pentenes; cis-pentadiene-1,3; trans-pentadiene-1,3; cyclopentene and alkanes and the concentrate typically contains 1.0 to 10% alkanes, 58 to 64% diolefins and 29 to 35% monoolefins. The catalyst is a mixture of copper chromite, copper oxide and manganese oxide. After cooling the reaction mixture and venting off the excess hydrogen, the catalyst was removed by filtration and the resin was isolated by first removing solvent under nitrogen followed by normal steam sparging at 225° C. A light colored (G-1-; YID=27.2) resin with a R & B softening point of 94° C. was obtained in 97.1% yield; MMAP=95° C. The sample of PICCOTAC® 95 synthetic resin before hydrotreatment had a yellow color (G-3; YID=61.4) with a softening point of 95° C. and a MMAP of 95° C.

EXAMPLE 2

A solution of 300.0 g HERCOTAC® 1149 synthetic resin in 200 g aliphatic diluent (recycled mineral spirits) was contacted with hydrogen in the presence of 6.0 g copper chromite (Engelhard CU 1950P, available from Engelhard Corporation, Chemical Catalyst Group, Iselin, N.J.) in a stirred autoclave for 2.0 hours at 225° C. using a hydrogen pressure of 900 psi. HERCOTAC® 1149 synthetic resin, available from Hercules, Incorporated, Wilmington, Del., is an aromatic-modified C-5 hydrocarbon resin made from piperylene concentrate and styrene. The catalyst was then removed by filtration after venting off excess hydrogen. The resin was isolated by standard stripping techniques, finally sparging with steam at 225° C. The product, obtained in a yield of 95.4%, had a Gardner color of G-1- and a YID of 20.0, a R & B softening point of 97° C. and a MMAP of 69° C. The yellow HERCOTAC® 1149 synthetic resin before hydrotreating had a G- 4+ Gardner color and a YID of 84.3, with a softening point of 98° C. and a MMAP of 69° C.

EXAMPLE 3

This example describes hydrotreating a C-5 hydrocarbon resin that is still dissolved in the solvent used for polymerizing the monomers from which the resin was made.

The resin was prepared from piperylene concentrate and isobutylene in toluene using an $AlCl_3$ catalyst. The piperylene concentrate is described in Example 1. The solution of the resin in toluene was neutralized and then subjected to partial distillation to remove the low boiling unreacted and unreactive C-5 portion. The partial distillation step is not required for hydrotreating and was included only for convenience to remove odiferous materials. The polymerizate to be treated (500.0 g) contained the C-5 resin, oligomeric oils and toluene solvent, and was mixed with 10.4 g copper/zinc catalyst (Engelhard 0890P, available from Engelhard Corporation, Chemical Catalyst Group, Iselin, N.J.) in a stirred autoclave and hydrotreated at 900 psi hydrogen pressure for four hours at 250° C. The copper/zinc catalyst is a mixture of copper, zinc and aluminum oxides. After cooling to 70° C. and venting excess hydrogen, catalyst was removed by filtration. The product was isolated by a normal stripping procedure, finally steam sparging at 225° C. and atmospheric pressure. A water white resin with a Gardner color of G-1- (YID=10.2) was obtained with a R & B softening point of 90° C. and a MMAP of 97° C. As a comparison, the C-5 resin isolated directly from the depentanized polymerizate (no hydrotreatment) had a Gardner color of G-3, R & B softening point of 95° C. and a MMAP of 95° C.

During the recovery of the water white hydrotreated product, the solvent was also recovered and analyzed. Analysis by gas liquid chromatography revealed that the solvent was essentially all toluene, with little or no conversion of the toluene to methylcyclohexane by hydrogenation of the aromatic ring.

EXAMPLE 4

This example describes the hydrotreating of a C-9 hydrocarbon resin that is still dissolved in the solvent used for polymerizing the monomers from which the resin was made.

A C-9 feedstock typically containing styrene, α-methylstyrene, vinyltoluene, indene, and alkyl-substituted indenes, as reactive components, was polymerized using a $BF_3$ catalyst. The feedstock typically also contains nonreactive alkylaromatic compounds. The feedstock typically contains 50–60% olefinic components and 40 to 50% alkylaromatic compounds. The polymerizate, which contained C-9 resin, oligomeric oils and a mixed aromatic solvent, was neutralized before use.

Copper/zinc (Engelhard CU-0890P) (7.0 parts) was added to 1000 parts of the C-9 polymerizate in a stirred autoclave. Hydrotreating was carried out first at 100 psi during a 1.5 hour heat-up period and finally at 900 psi hydrogen pressure at 250° C. for an additional 1.5 hours. After filtration to remove catalyst, the resulting treated polymerizate had a color of G-1-. The product was isolated by conventional stripping techniques, finally steam sparging at 240° C. to give a resin with a Gardner color of G-1- (YID= 28.2), a softening point of 135.5° C., and a MMAP of 8° C. The non-hydrotreated C-9 resin isolated directly from the polymerizate had a softening point of 148° C. with a Gardner color of G-8+ (YID=142.8) and a MMAP of 8° C.

The solvent from the finishing operation to recover the hydrotreated resin was removed by distillation and subjected to analyses by infra-red and by determining the heptane mixed aniline point (HMAP), and compared to solvent distilled from non-hydrotreated resin. These tests indicated that the mixed aromatic solvents were virtually identical, showing that the aromatic rings in this mixture were not hydrogenated to form cyclohexane rings.

EXAMPLE 5

This example describes the hydrotreating of a terpene-phenolic hydrocarbon resin that is still dissolved in the solvent used during the polymerization of the monomers from which the resin was made.

A low molecular weight terpene-phenolic resin was prepared in a mixed aromatic solvent by reacting an alpha-pinene rich stream with an excess of phenol in the presence of a $BF_3$ catalyst. The major components of the solvent were xylenes, ethyltoluenes, mesitylene, pseudocumene, and hemimellitene, the remainder being higher boiling unidentified aromatic compounds. After neutralization and filtration to remove catalyst, 500 g of the polymerizate was hydrotreated using 1.97 g copper chromite (Engelhard CU 1950P, available from Engelhard Corporation, Chemical Catalyst Group, Iselin, N.J.). The final resin isolated after four hours of hydrotreatment at 250° C. and 400 psi hydrogen pressure had a Gardner color of 2– with a R & B softening point of 128° C. and an OMS Cloud Point of 104°/103° C. For comparison, the resin isolated directly from the non-hydrotreated polymerizate had a Gardner color of 7– with a softening point of 128° C. and an OMS Cloud Point of 104°/103° C.

EXAMPLE 6

This example illustrates that hydrogenation of the aromatic-modified C-5 hydrocarbon resin does not occur during the hydrotreating process of this invention, and also compares the selectivity of various catalysts under two combinations of temperature and pressure.

An aromatic-modified C-5 resin was prepared from 60 parts alpha-methylstyrene and 40 parts of piperylene concentrate in 30 parts toluene solvent using an aluminum chloride catalyst. After neutralization, a resinous product was isolated by stripping until a nominal R & B softening point of 70° C. was obtained. This yellow resin had a Gardner color of 4+ (YID=83.9) and an MMAP of 23° C. The stripping step was not required for hydrotreating. It was done to isolate the untreated resin for characterization.

The aromatic-modified C-5 resin contained a high level of α-methylstyrene units, which provided readily available sites where hydrogenation could occur. Hydrogenation of the aromatic portion of the resin would result in an increase in the MMAP. An increase in the MMAP would therefore indicate that conventional hydrogenation was occurring rather than the hydrotreating process of this invention.

After measuring the R&B softening point, Gardner color, YID and MMAP, the resin was redissolved. A series of samples was hydrotreated as shown in Table I. Catalyst selectivity is indicated when the MMAP remains unchanged after hydrotreating, even though the color changes significantly. A MMAP of 23° C.±2 degrees is considered to be no change.

TABLE I

| | HYDROTREATMENT CATALYSTS/CONDITIONS | | | | | | | | | |
|---|---|---|---|---|---|---|---|---|---|---|
| Experiment No. | 1 | 2 | 3 | 4 | 5 | 6 | 7 | 8 | 9 | 10 |
| Formula | | | | | | | | | | |
| Parts C-5/Aromatic Resin | 200 | 200 | 200 | 200 | 200 | 200 | 200 | 200 | 200 | 200 |
| Parts Odorless Min. Spirits | 200 | 200 | 200 | 200 | 200 | 200 | 200 | 200 | 200 | 200 |
| Catalyst* | A | A | B | B | C | C | D | D | E | E |
| Parts Catalyst | 2.0 | 4.0 | 2.0 | 4.0 | 2.0 | 4.0 | 2.0 | 4.0 | 2.0 | 4.0 |
| Conditions | | | | | | | | | | |
| Hydrotreatment Temp. (°C.) | 250 | 225 | 250 | 225 | 250 | 225 | 250 | 225 | 250 | 225 |
| Hydrotreatment Time (Hrs.) | 4.0 | 4.0 | 4.0 | 4.0 | 4.0 | 4.0 | 4.0 | 4.0 | 4.0 | 4.0 |
| Hydrogen Pressure (psi) | 900 | 400 | 900 | 400 | 900 | 400 | 900 | 400 | 900 | 400 |
| Products | | | | | | | | | | |
| Color-Gardner | 1– | 1– | 1– | 3+ | 1– | 1– | 1– | 1– | 1– | 1– |
| Color-YID | 5.7 | 8.2 | 17.8 | 62.5 | 3.9 | 5.4 | 8.1 | 5.8 | 5.4 | 6.6 |
| Ring and Ball Softening Point (°C.)** | 64 | 73 | 67 | 73 | 72 | 76 | 77 | 74 | 70 | 73 |
| MMAP (°C.) | 31 | 25 | 40 | 29 | 80 | 49 | 22 | 24 | 24 | 24 |

*A = Sulfided Platinum (Engelhard) (3% Pt/Cp-41 MRW, S)
*B = Ruthenium on Alumina (Engelhard ESCAT 44)
*C = 5% Palladium on Charcoal (EM Science, Div. of EM Industries, Inc., Cherry Hill, NJ)
*D = Copper Chromite (Engelhard CU 1950P)
*E = Copper/Zinc (Engelhard CU 0890P)
** = Differences in softening points are the result of differences in stripping conditions.

As can be seen in Experiments 1 and 2 of Table I, the sulfided platinum catalyst exhibits some selectivity under the more severe conditions of temperature and pressure, and becomes very selective under the milder set of conditions, resulting in an experimentally insignificant change in MMAP while providing the desirable water white color. The ruthenium catalyst exhibited less selectivity (MMAP=40° C.) under the severe conditions and was not able to significantly reduce color at milder conditions, even though the MMAP was much lower. The palladium catalyst gave no selectivity at the high temperature and pressure and was just beginning to achieve selectivity at the lower temperature and pressure. Copper chromite and copper/zinc provided total selectivity under both sets of conditions, with no significant change in the MMAP.

EXAMPLE 7

A sample of PICCOTAC® 95 synthetic resin was hydrotreated using the conditions described in Example 1. This product and the non-hydrotreated sample of PICCOTAC® 95 synthetic resin were subjected to extensive analyses to determine whether any properties of the resins other than color were affected.

|  | Hydrotreated PICCOTAC® 95 Synthetic Resin | Untreated PICCOTAC® 95 Synthetic Resin |
|---|---|---|
| Soft. Pt. (°C.) | 96 | 97 |
| Color (YID) | 38 | 61.4 |
| Color (50%/Tol.) | G-1- | G-3 |
| OMSCP (°C.) | <-50 | <-50 |
| MMAP (°C.) | 96.6 | 96 |
| DACP (°C.) | 50 | 50 |
| UVα | 2.08 | 2.06 |
| Mol. Wt. (UV det.) |  |  |
| $M_w$ | 1482 | 1432 |
| $M_n$ | 873 | 873 |
| $M_z$ | 2675 | 2635 |
| PD | 1.69 | 1.71 |

In the table, UVα is the ultraviolet absorbance measured at 266 nanometers. The lack of change in the measured value indicated that there is no change in the amount of residual unsaturation in the resin. The molecular weights were measured using size exclusion chromatography with a UV detector. $M_w$ is the weight average molecular weight, $M_n$ is the number average molecular weight, $M_z$ is a measure of the high molecular weight tail of the resin and PD is the polydispersity ($M_w/M_n$).

The data show that the only significant measurable change resulting from the hydrotreatment process of this invention was decolorization of the resin.

The heat stability in air of the hydrotreated resin described above was compared to the heat stability of the non-hydrotreated PICCOTAC® 95 synthetic resin starting material. Each resin (20.0 g) was weighed into separate 50 ml beakers and placed in an air circulating oven for 24 hours at 350° F. (177° C). Gardner colors before and after were determined.

|  | Hydrotreated PICCOTAC® 95 Synthetic Resin | PICCOTAC® 95 Synthetic Resin |
|---|---|---|
| Initial Color | G-1- | G-3 |
| 24 Hour Color | G-9+ | G-10- |

The notation "G-1-" indicates that the color was lighter than G-1. "G-9+" indicates that the color was slightly darker than G-9, but not as dark as G-10.

In each case the heat aged resin darkened, and the final products had almost identical Gardner colors, indicating no improvement in heat stability. By comparison, known selective hydrogenation processes claim an improvement in heat stability ascribed to hydrogenation of color body precursors. From this data it was concluded that color bodies, but not color-forming precursors, were removed from the hydrocarbon resin by the hydrotreating process of this invention.

EXAMPLE 8

A solution of 200 parts PICCOVAR® L-60 hydrocarbon resin in 200 parts odorless mineral spirits was hydrotreated in a stirred autoclave for four hours at 250° C. and 900 psi hydrogen pressure using 4.0 parts copper zinc catalyst (Engelhard CU-0890P). PICCOVAR® L-60 hydrocarbon resin is an aromatic-modified dicyclopentadiene resin, available from Hercules Incorporated, Wilmington, Del. After filtration to remove catalyst, the resin was isolated by normal steam stripping techniques to give a water white product with a R & B softening point of 60° C., color of G-1- (YID=13.1), MMAP of 16° C. and OMS cloud point of -20/<-60° C. The resin before hydrotreatment had a R & B softening point of 60° C., color of G-8+ (YID=163.8), MMAP of 13° C. and OMS cloud point of -15/<-60° C.

EXAMPLE 9

This example describes the hydrotreating of a neat liquid C-5 hydrocarbon resin.

A mixture of 400.0 g ADTAC® LV, a synthetic hydrocarbon resin available from Hercules Incorporated, Wilmington, Del., and 8.0 parts copper zinc (Engelhard CU-0890P) was hydrotreated for four hours at 225° C. and 900 psi hydrogen. ADTAC® LV hydrocarbon resin is a liquid C-5 hydrocarbon resin derived from piperylene concentrate. The piperylene concentrate is described in Example 1. The water white (G- 1- color, neat) product was isolated directly by filtration. By comparison, the liquid product before hydrotreatment had a Gardner color of G-4 neat.

What is claimed is:

1. A process for lightening the color of noncrystalline hydrocarbon resins having carbon-carbon double bonds and containing color bodies, said process consisting essentially of contacting a noncrystalline hydrocarbon resin having a weight average molecular weight of 250–10,000 with hydrogen in the absence of polymerization catalyst residues and in the presence of a catalyst that promotes the hydrogenation of the color bodies without substantially changing the softening point or the content of carbon-carbon double bonds in the resin, said resin being selected from the group consisting of C-5 hydrocarbon resins, C-9 hydrocarbon resins, mixed C-5/C-9 hydrocarbon resins, vinyl aromatic-modified C-5 hydrocarbon resins, dicyclopentadiene resins, aromatic-modified dicyclopentadiene resins, terpene resins, and terpene-phenolic resins.

2. The process of claim 1, wherein the catalyst is selected from the group consisting of Group IB, IIB, VIB, VIIB and VIII metal catalysts.

3. The process of claim 2, wherein the catalyst is selected from the group consisting of copper chromite, copper/zinc, sulfided platinum on charcoal, ruthenium on alumina and palladium on charcoal.

4. The process of claim 3, wherein the catalyst is copper chromite.

5. The process of claim 3, wherein the catalyst is copper/zinc.

6. The process of claim 1, wherein the resin is an aliphatic hydrocarbon resin and the Gardner color is less than 2 after the contacting step.

7. The process of claim 6, wherein the Gardner color is less than 1.

8. The process of claim 1, wherein the resin is an aromatic hydrocarbon resin and the Gardner color is 5 or less after the contacting step.

9. The process of claim 8, wherein the Gardner color is 3 or less.

10. The process of claim 9, wherein the Gardner color is less than 1.

11. The process of claim 1, wherein the difference between the methylcyclohexane aniline cloud point (MMAP) of the resin before the contacting step and the MMAP of the resin after the contacting step is 5° C. or less.

12. The process of claim 11, wherein the difference is 3° C. or less.

13. The process of claim 12, wherein the difference is 2° C. or less.

14. The process of claim 1, wherein the resin has a Gardner color less than 1 after the contacting step, and the difference between the methylcyclohexane aniline cloud point (MMAP) of the resin before the contacting step and the MMAP after the contacting step is 5° C. or less.

15. The process of claim 1, wherein the noncrystalline resin contains color body precursors and the color body precursors are not hydrogenated during the contacting step.

16. The process of claim 1, wherein the resin has a Gardner color less than 1 after the contacting step.

17. The process of claim 1, wherein the resin is prepared by polymerization of monomers in a solvent and the contacting takes place while the resin is dissolved in the solvent used for the polymerization.

18. The process of claim 17, wherein the polymerization solvent is recovered unchanged after the contacting step and is recycled in the process.

19. The process of claim 18, wherein the solvent is an aromatic solvent.

20. The process of claim 18, wherein the catalyst is selected from the group consisting of Group IB, IIB, VIB, VIIB and VIII metal catalysts.

21. The process of claim 20, wherein the catalyst is selected from the group consisting of copper chromite, copper/zinc, sulfided platinum on charcoal, ruthenium on alumina and palladium on charcoal.

22. The process of claim 21, wherein the catalyst is copper chromite.

23. The process of claim 21, wherein the catalyst is copper/zinc.

24. The process of claim 1, wherein the contacting takes place while the resin is in the molten state (neat).

25. The process of claim 24, wherein the catalyst is selected from the group consisting of Group IB, IIB, VIB, VIIB and VIII metal catalysts.

26. The process of claim 25, wherein the catalyst is selected from the group consisting of copper chromite, copper/zinc, sulfided platinum on charcoal, ruthenium on alumina and palladium on charcoal.

27. The process of claim 26, wherein the catalyst is copper chromite.

28. The process of claim 26, wherein the catalyst is copper/zinc.

29. The process of claim 3, wherein the catalyst is copper chromite.

30. The process of claim 3, wherein the catalyst is copper/zinc.

31. The process of claim 1, wherein the contacting is carried out in the absence of a reactive diluent.

32. The process of claim 1, wherein the resin is prepared by polymerization of monomers in a solvent and the contacting takes place while the resin is dissolved in the solvent used for the polymerization.

33. The process of claim 32, wherein the polymerization solvent is recovered unchanged after said contacting step and is recycled in the process.

34. The process of claim 33, wherein the solvent is aromatic.

35. The process of claim 3, wherein the Gardner color of the resin after the contacting step is less than 1, the difference between the methylcylcohexane aniline cloud point (MMAP) of the resin before the contacting step and the MMAP of the resin after the contacting step is 5° C. or less, and the contacting takes place at a temperature of from about 50° to about 300° C. and a pressure of from about 50 to about 2500 psi.

36. A process for preparing a light colored hydrocarbon resin, said process consisting essentially of (1) polymerizing unsaturated monomers to form a noncrystalline hydrocarbon resin having carbon-carbon double bonds and a weight average molecular weight Mw of 250–10,000, and containing color bodies, and (2) contacting the resin with hydrogen in the absence of polymerization catalyst residues and in the presence of a catalyst that promotes the hydrogenation of the color bodies without substantially changing the softening point or the content of carbon-carbon double bonds in the resin, said resin being selected from the group consisting of C-5 hydrocarbon resins, C-9 hydrocarbon resins, mixed C-5/C-9 hydrocarbon resins, vinyl aromatic-modified C-5 hydrocarbon resins, dicyclopentadiene resins, aromatic-modified dicyclopentadiene resins, terpene resins, and terpene-phenolic resins.

37. The process of claim 36, wherein the catalyst is selected from the group consisting of Group IB, IIB, VIB, VIIB and VIII metal catalysts.

38. The process of claim 37 wherein the catalyst is selected from the group consisting of copper chromite, copper/zinc, sulfided platinum on charcoal, ruthenium on alumina and palladium on charcoal.

39. The process of claim 38, wherein the catalyst is copper chromite.

40. The process of claim 38, wherein the catalyst is copper/zinc.

41. The process of claim 36, wherein the resin is an aliphatic hydrocarbon resin and the Gardner color is less than 2 after the contacting step.

42. The process of claim 41, wherein the Gardner color is less than 1.

43. The process of claim 36, wherein the resin is an aromatic resin and the Gardner color is 5 or less after the contacting step.

44. The process of claim 43, wherein the Gardner color is 3 or less.

45. The process of claim 44, wherein the Gardner color is less than 1.

46. The process of claim 36, wherein the difference between the methylcyclohexane aniline cloud point (MMAP) of the resin before the contacting step and the MMAP of the resin after the contacting step is 5° C. or less.

47. The process of claim 46, wherein the difference is 3° C. or less.

48. The process of claim 47, wherein the difference is 2° C. or less.

49. The process of claim 36, wherein the noncrystalline resin contains color body precursors and the color body precursors are not hydrogenated during the contacting step.

50. The process of claim 36, wherein the resin has a Gardner color less than 1 after the contacting step and the difference between the methylcyclohexane aniline cloud point (MMAP) of the resin before the contacting step and the MMAP after the contacting step is 5° C. or less.

51. The process of claim 42, wherein the resin has a Gardner color less than 1 after the contacting step.

52. The process of claim 36, wherein the resin is prepared by polymerization of monomers in a solvent and the contacting takes place while the resin is dissolved in the solvent used for the polymerization.

53. The process of claim 52, wherein the polymerization solvent is recovered unchanged after the contacting step and is recycled in the process.

54. The process of claim 53, wherein the solvent is an aromatic solvent.

55. The process of claim 52, wherein the catalyst is selected from the group consisting of Group IB, IIB, VIB, VIIB and VIII metal catalysts.

56. The process of claim 55, wherein the catalyst is selected from the group consisting of copper chromite, copper/zinc, sulfided platinum on charcoal, ruthenium on alumina and palladium on charcoal.

57. The process of claim 56, wherein the catalyst is copper chromite.

58. The process of claim 56, wherein the catalyst is copper/zinc.

59. The process of claim 36, wherein the contacting takes place while the resin is in the molten state (neat).

60. The process of claim 59, wherein the catalyst is selected from the group consisting of Group IB, IIB, VIB, VIIB and VIII metal catalysts.

61. The process of claim 60, wherein the catalyst is selected from the group consisting of copper chromite, copper/zinc, sulfided platinum on charcoal, ruthenium on alumina and palladium on charcoal.

62. The process of claim 61, wherein the catalyst is copper chromite.

63. The process of claim 61, wherein the catalyst is copper/zinc.

64. The process of claim 44, wherein the catalyst is copper chromite.

65. The process of claim 44, wherein the catalyst is copper/zinc.

66. The process of claim 42 wherein the resin is prepared by polymerization of monomers in a solvent and the contacting takes place while the resin is dissolved in the solvent used for the polymerization.

67. The process of claim 66, wherein the polymerization solvent is recovered unchanged after said contacting step and is recycled in the process.

68. The process of claim 67, wherein the solvent is an aromatic solvent.

69. The process of claim 38, wherein the Gardner color of the resin after the contacting step is less than 1, the difference between the methylcyclohexane aniline cloud point (MMAP) of the resin before the contacting step and the MMAP of the resin after the contacting step is 5° C. or less and the contacting takes place at a temperature of from about 50° to about 300° C. and a pressure of from about 50 to about 2500 psi.

* * * * *